United States Patent
Itsui

(10) Patent No.: US 12,393,780 B2
(45) Date of Patent: Aug. 19, 2025

(54) INFORMATION PROCESSING DEVICE, AND GENERATION METHOD

(71) Applicant: Mitsubishi Electric Corporation, Tokyo (JP)

(72) Inventor: Hiroyasu Itsui, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 319 days.

(21) Appl. No.: 18/100,011

(22) Filed: Jan. 23, 2023

(65) Prior Publication Data

US 2023/0153524 A1   May 18, 2023

Related U.S. Application Data

(63) Continuation of application No. PCT/JP2020/033234, filed on Sep. 2, 2020.

(51) Int. Cl.
*G10L 15/26* (2006.01)
*G06F 16/3329* (2025.01)
*G06F 40/268* (2020.01)

(52) U.S. Cl.
CPC ........ *G06F 40/268* (2020.01); *G06F 16/3329* (2019.01)

(58) Field of Classification Search
None
See application file for complete search history.

(56) References Cited

U.S. PATENT DOCUMENTS

| 5,535,120 | A * | 7/1996 | Chong ................. G06F 40/242 715/236 |
| 6,260,008 | B1 * | 7/2001 | Sanfilippo ............ G06F 40/253 715/256 |
| 10,229,184 | B2 * | 3/2019 | English .................. G06F 16/93 |
| 2004/0181389 | A1 * | 9/2004 | Bourigault ............ G06F 40/211 704/1 |

(Continued)

FOREIGN PATENT DOCUMENTS

| CN | 107578106 A | 1/2018 |
| JP | 62-221776 A | 9/1987 |
| JP | 2009-181408 A | 8/2009 |

OTHER PUBLICATIONS

Chinese Office Action and Search Report for Chinese Application No. 202080103240.8, dated Apr. 20, 2024, with English translation.

(Continued)

*Primary Examiner* — Neeraj Sharma
(74) *Attorney, Agent, or Firm* — Birch, Stewart, Kolasch & Birch, LLP

(57) ABSTRACT

An information processing device includes an acquisition unit that acquires a plurality of character strings, a morphological analysis execution unit that executes morphological analysis on the plurality of character strings, and a generation unit that generates a learned model for inferring meaning of a first word included in a plurality of words among a plurality of speech-parted words obtained by executing the morphological analysis on the plurality of character strings based on a plurality of words as a plurality of predicates among the plurality of speech-parted words and a plurality of words among the plurality of speech-parted words.

8 Claims, 12 Drawing Sheets

(56) References Cited

U.S. PATENT DOCUMENTS

| | | | |
|---|---|---|---|
| 2016/0012336 A1* | 1/2016 | Franceschini | G06F 16/3334 |
| | | | 706/55 |
| 2016/0232226 A1* | 8/2016 | McManis, Jr. | G06F 40/263 |
| 2020/0184155 A1* | 6/2020 | Galitsky | G06F 40/279 |
| 2020/0242146 A1* | 7/2020 | Kalukin | G06F 16/3329 |
| 2020/0312297 A1* | 10/2020 | Chatterjee | G06F 40/169 |
| 2021/0005316 A1* | 1/2021 | Neumann | G06F 40/35 |
| 2022/0036007 A1* | 2/2022 | Hsiao | G06F 40/247 |
| 2022/0207237 A1* | 6/2022 | Henmi | G06F 40/30 |

OTHER PUBLICATIONS

Bullinaria et al., "Extracting semantic representations from word co-occurrence statistics: A computational study", Behavior Research Methods, 2007, vol. 39, No. 3, pp. 510-526.

Okazaki, "Frontiers in Distributed Representations for Natural Language Processing", Journal of Japanese Society for Artificial Intelligence, Mar. 2016, vol. 31, No. 2, pp. 189-201.

Chinese Office Action and Search Report for Chinese Application No. 202080103240.8, dated Oct. 31, 2024, with English translation.

Chinese Office Action for Chinese Applicatino No. 202080103240.8, dated Apr. 2, 2025, with English translation.

* cited by examiner

FIG. 5

| PREDICATE LABEL | SUB-WORD CONTEXT MATRIX | | | | | | | | | | |
|---|---|---|---|---|---|---|---|---|---|---|---|
| | | | WORD $w_j$ | | | | | | | | |
| | | $w_1$ | ... | DRIVER (NOUN) | CAR (NOUN) | TOOL (NOUN) | GOLF (NOUN) | TAXI (NOUN) | PRECISION (NOUN) | ... | $w_M$ |
| $v_1$ | ... | ... | ... | ... | ... | ... | ... | ... | ... | ... | ... |
| DRIVE (VERB) WORD $w_j$ | $w_1$ | ... | ... | ... | ... | ... | ... | ... | ... | ... | ... |
| | ... | ... | ... | ... | ... | ... | ... | ... | ... | ... | ... |
| | DRIVER (NOUN) | ... | ... | 1 | 1 | 0 | 0 | 0 | 0 | ... | ... |
| | CAR (NOUN) | ... | ... | 1 | 1 | 0 | 0 | 0 | 0 | ... | ... |
| | TOOL (NOUN) | ... | ... | 0 | 0 | 0 | 0 | 0 | 0 | ... | ... |
| | GOLF (NOUN) | ... | ... | 0 | 0 | 0 | 0 | 0 | 0 | ... | ... |
| | TAXI (NOUN) | ... | ... | 0 | 0 | 0 | 0 | 0 | 0 | ... | ... |
| | PRECISION (NOUN) | ... | ... | 0 | 0 | 0 | 0 | 0 | 0 | ... | ... |
| | ... | ... | ... | ... | ... | ... | ... | ... | ... | ... | ... |
| | $w_M$ | ... | ... | ... | ... | ... | ... | ... | ... | ... | ... |
| ... | | | | | | | | | | | |
| $v_K$ | | | | | | | | | | | |

FIG. 6

| PREDICATE LABEL | SUB-WORD CONTEXT MATRIX | | | | | | |
|---|---|---|---|---|---|---|---|
| $V_1$ | ... | | | | | | |
| ... | ... | | | | | | |
| DRIVE (VERB) | | ... | CAR (NOUN) | TOOL (NOUN) | GOLF (NOUN) | TAXI (NOUN) | PRECISION (NOUN) | ... |

| PREDICATE LABEL | | ... | CAR (NOUN) | TOOL (NOUN) | GOLF (NOUN) | TAXI (NOUN) | PRECISION (NOUN) | ... |
|---|---|---|---|---|---|---|---|---|
| DRIVE (VERB) | $W_1$ | ... | ... | ... | ... | ... | ... | ... |
| | ... | ... | ... | ... | ... | ... | ... | ... |
| | DRIVER (NOUN) | ... | 159 | 0 | 0 | 15 | 0 | ... |
| | ... | ... | ... | ... | ... | ... | ... | ... |
| | $W_M$ | ... | ... | ... | ... | ... | ... | ... |
| WORK (VERB) | | ... | CAR (NOUN) | TOOL (NOUN) | GOLF (NOUN) | TAXI (NOUN) | PRECISION (NOUN) | ... |
| | $W_1$ | ... | ... | ... | ... | ... | ... | ... |
| | ... | ... | ... | ... | ... | ... | ... | ... |
| | DRIVER (NOUN) | ... | 0 | 9 | 0 | 0 | 1 | ... |
| | ... | ... | ... | ... | ... | ... | ... | ... |
| | $W_M$ | ... | ... | ... | ... | ... | ... | ... |
| HIT (VERB) | | ... | CAR (NOUN) | TOOL (NOUN) | GOLF (NOUN) | TAXI (NOUN) | PRECISION (NOUN) | ... |
| | $W_1$ | ... | ... | ... | ... | ... | ... | ... |
| | ... | ... | ... | ... | ... | ... | ... | ... |
| | DRIVER (NOUN) | ... | 1 | 0 | 6 | 0 | 0 | ... |
| | ... | ... | ... | ... | ... | ... | ... | ... |
| | $W_M$ | ... | ... | ... | ... | ... | ... | ... |
| ... | ... | | | | | | | |
| $V_K$ | ... | | | | | | | |

FIG. 8

| QUESTION SENTENCE | ANSWER SENTENCE |
|---|---|
| No.1 | THE CARRY OF THE DRIVER IS UNSATISFACTORY. | A GOLF BEGINNER···. THE KNACK FOR HITTING···. THIS INCREASES THE CARRY AND ENABLES YOU TO HIT THE BALL FOR A LONG DISTANCE. |
| ... | ... | ... |

SUB-WORD CONTEXT MATRIX

| PREDICATE LABEL | | WORD $w_i$ | | WORD $w_j$ | | | | | | |
|---|---|---|---|---|---|---|---|---|---|---|
| | | | $w_1$ | ... | CAR (NOUN) | CARRY (NOUN) | GOLF (NOUN) | TAXI (NOUN) | PRECISION (NOUN) | EMPLOYEE (NOUN) | ... | $w_M$ |
| $V_1$ HIT (VERB) | $w_1$ | | | | | | | | | |
| | ... | ... | ... | ... | ... | ... | ... | ... | ... | ... |
| | DRIVER (NOUN) | ... | ... | 0 | 1 | 1 | 0 | 0 | 0 | ... |
| | ... | ... | ... | ... | ... | ... | ... | ... | ... | ... |
| | $w_M$ | | | | | | | | | |
| ... | | | | | | | | | | |
| $V_K$ | | | | | | | | | | |

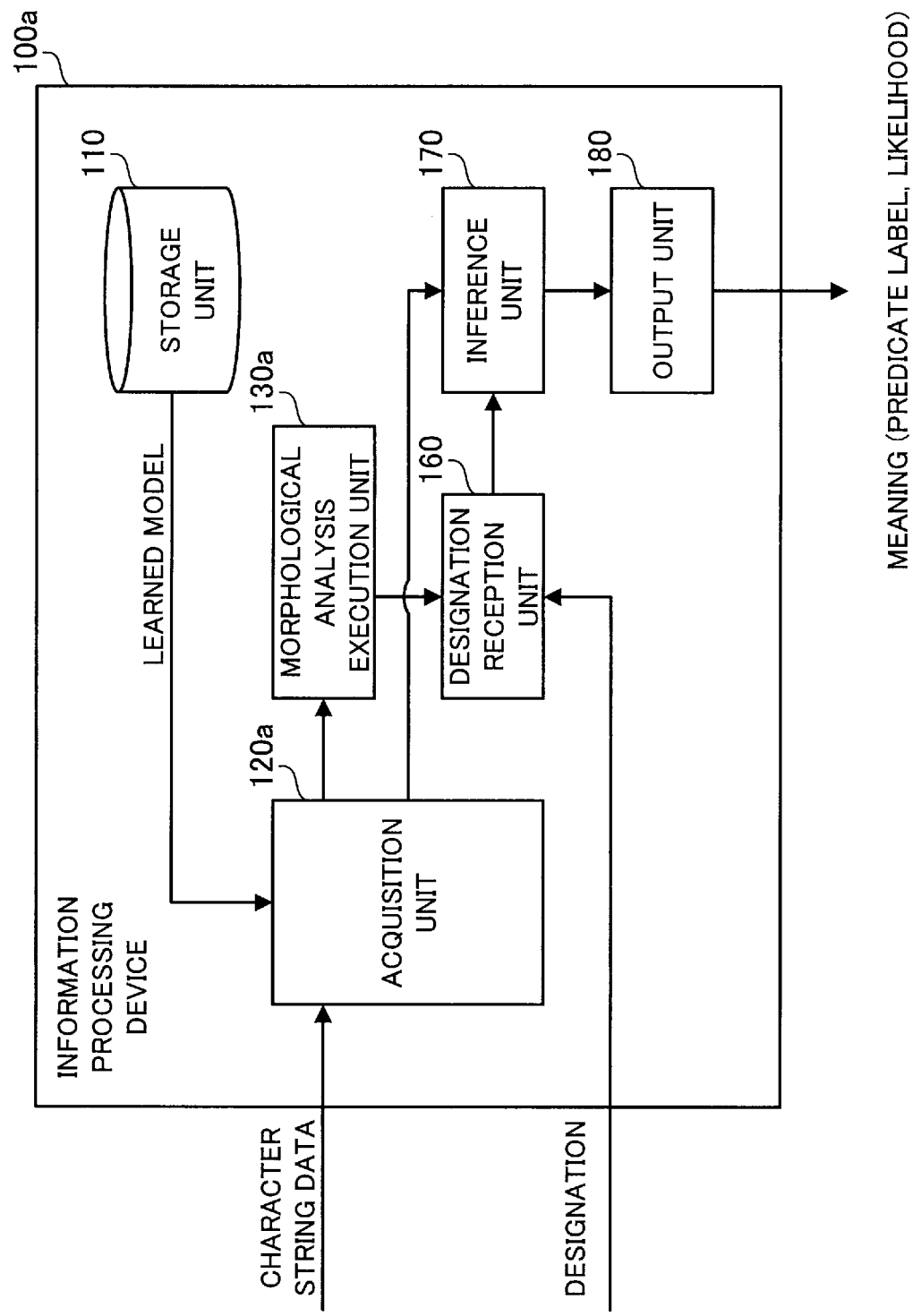

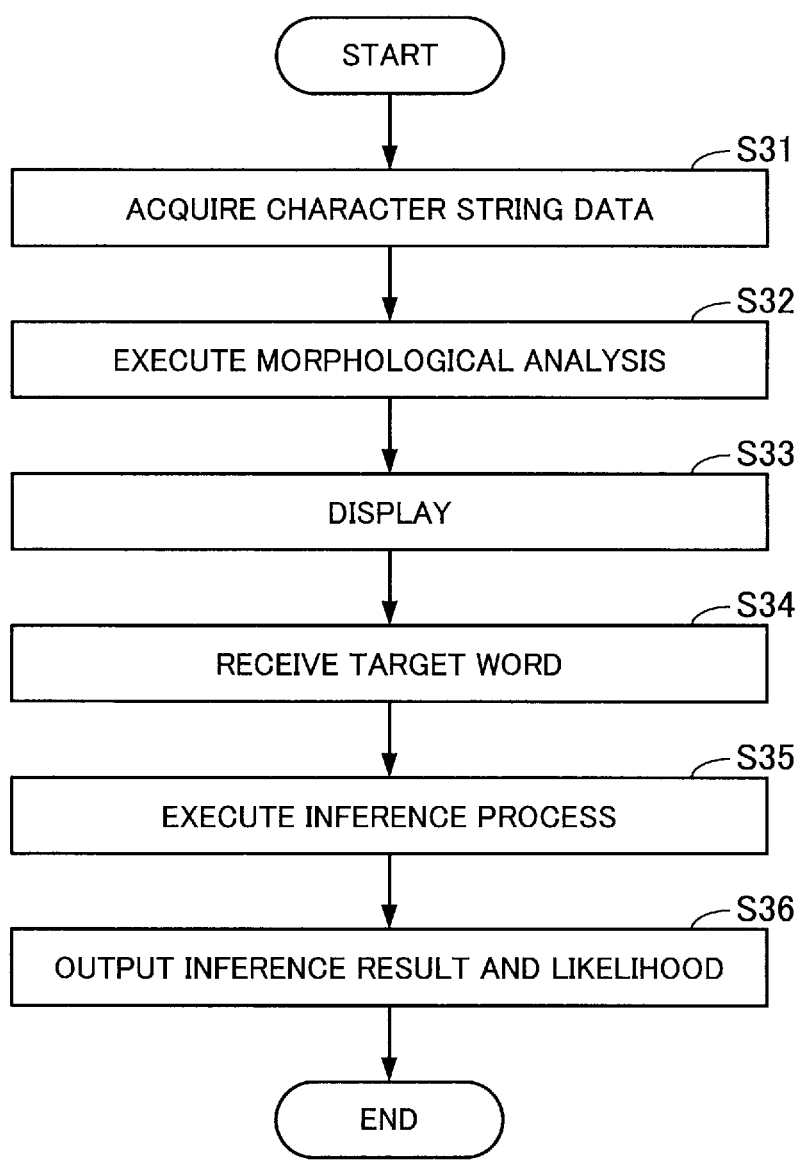

FIG. 11

| | $w_1$ | ... | CAR (NOUN) | TOOL (NOUN) | GOLF (NOUN) | TAXI (NOUN) | PRECISION (NOUN) | ... | $w_M$ |
|---|---|---|---|---|---|---|---|---|---|
| $w_1$ | ... | ... | ... | ... | ... | ... | ... | ... | ... |
| ... | ... | ... | ... | ... | ... | ... | ... | ... | ... |
| DRIVER (NOUN) | ... | ... | 159 | 26 | 28 | 209 | 6 | ... | ... |
| ... | ... | ... | ... | ... | ... | ... | ... | ... | ... |
| $w_M$ | ... | ... | ... | ... | ... | ... | ... | ... | ... |

$WORD_{wi}$ / $WORD_{wj}$

INFORMATION PROCESSING DEVICE, AND GENERATION METHOD

CROSS-REFERENCE TO RELATED APPLICATION

This application is a continuation application of International Application No. PCT/JP2020/033234 having an international filing date of Sep. 2, 2020.

BACKGROUND OF THE INVENTION

1. Field of the Invention

The present disclosure relates to an information processing device, and a generation method.

2. Description of the Related Art

A full-text search technology for searching an enormous amount of text for a desired text, a text classification technology for classifying texts based on the contents of description, and a question answering technology for making a computer answer questions from a humans have been researched over many years. In these technologies, semantic processing, analyzing the meaning of the contents of text described in a natural language, is important. Here, a technology regarding the semantic processing has been proposed (see Patent Reference 1). Further, a technology regarding the semantic processing is described in Non-patent Reference 1. For example, the Non-patent Reference 1 describes an example of learning based on distributed representations.
Patent Reference 1: Japanese Patent Application Publication No. S62-221776
Non-patent Reference 1: Naoaki Okazaki, "Frontiers in Distributed Representations in Natural Language Processing", Journal of the Japanese Society for Artificial Intelligence, Vol. 31, No. 2, pp. 189-201, March 2016

In the technology described in the Non-patent Reference 1, one word vector is assigned to one word. Therefore, only one meaning is inferred from a word to which a word vector has been assigned. However, the meaning of a word varies depending on the context. Thus, the technology described in the Non-patent Reference 1 is incapable of dealing with ambiguity of words. Further, the technology described in the Non-patent Reference 1 needs an enormous amount of processing time at the time of learning since vectors undergo dimensional compression.

SUMMARY OF THE INVENTION

An object of the present disclosure is to generate a learned model capable of dealing with the ambiguity in a short processing time.

An information processing device according to an aspect of the present disclosure is provided. The information processing device includes an acquisition unit that acquires a plurality of character strings, a morphological analysis execution unit that executes morphological analysis on the plurality of character strings, and a generation unit that generates a learned model for inferring meaning of a first word included in a plurality of words among a plurality of speech-parted words obtained by executing the morphological analysis on the plurality of character strings based on a plurality of words as a plurality of predicates among the plurality of speech-parted words and a plurality of words among the plurality of speech-parted words.

According to the present disclosure, a learned model capable of dealing with the ambiguity can be generated in a short processing time.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein:

FIG. 5 is a diagram showing an example (No. 1) of a sub-word context matrix in the first embodiment;

FIG. 6 is a diagram showing an example (No. 2) of the sub-word context matrix in the first embodiment;

FIG. 8 is a diagram showing a concrete example of a case where a learned model is generated based on a question sentence and an answer sentence in the first embodiment;

FIG. 9 is a diagram showing functional blocks included in the information processing device in a utilization phase in the first embodiment;

FIG. 10 is a flowchart showing an example of a process executed by the information processing device in the utilization phase in the first embodiment;

FIG. 11 is a diagram showing a comparative example;

DETAILED DESCRIPTION OF THE INVENTION

Embodiments will be described below with reference to the drawings. The following embodiments are just examples and a variety of modifications are possible within the scope of the present disclosure.

First Embodiment

Figure 1:
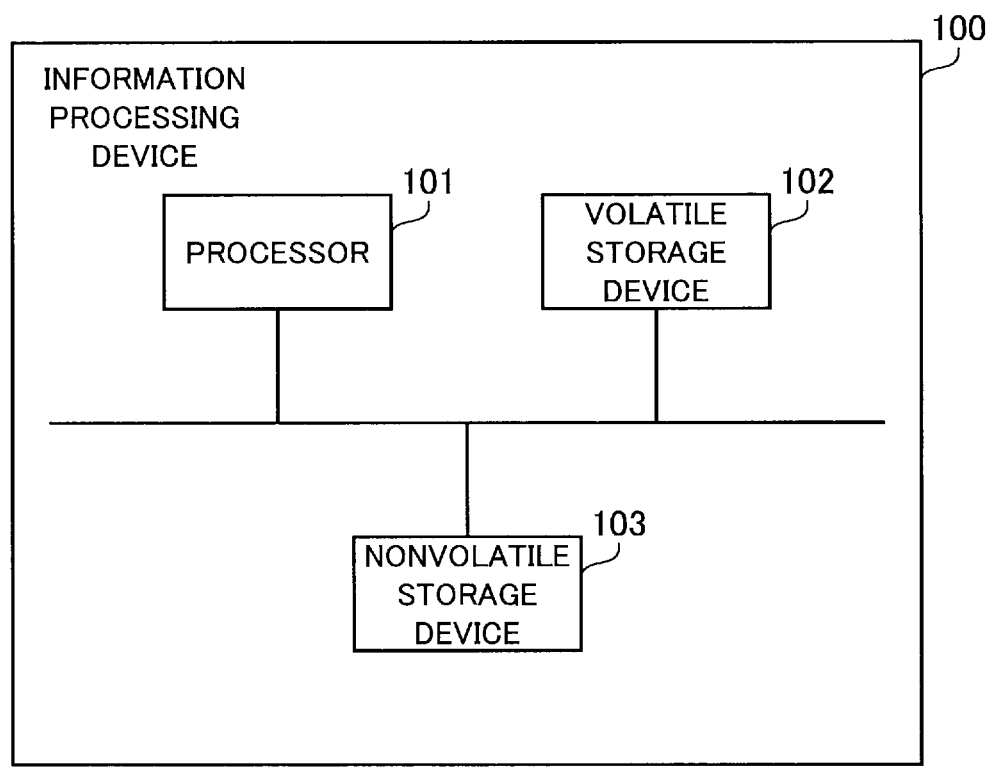
FIG. 1 is a diagram showing the configuration of hardware included in an information processing device in a first embodiment.

<Learning Phase>
FIG. 1 is a diagram showing the configuration of hardware included in an information processing device in a first embodiment. The information processing device 100 is a device that executes a generation method. The information processing device 100 may be referred to also as a learning device. For example, the information processing device 100 may be regarded as a cloud server. Further, the information processing device 100 can be a part of a system.

The information processing device 100 includes a processor 101, a volatile storage device 102 and a nonvolatile storage device 103.

The processor 101 controls the whole of the information processing device 100. For example, the processor 101 is a Central Processing Unit (CPU), a Field Programmable Gate Array (FPGA) or the like. The processor 101 can also be a multiprocessor. The information processing device 100 may also be implemented by processing circuitry or implemented by software, firmware or a combination of software and firmware. Incidentally, the processing circuitry may be either a single circuit or a combined circuit.

The volatile storage device 102 is main storage of the information processing device 100. The volatile storage device 102 is a Random Access Memory (RAM), for example. The nonvolatile storage device 103 is auxiliary storage of the information processing device 100. The nonvolatile storage device 103 is a Hard Disk Drive (HDD) or a Solid State Drive (SSD), for example.

Next, functions included in the information processing device 100 will be described below.

Figure 2:
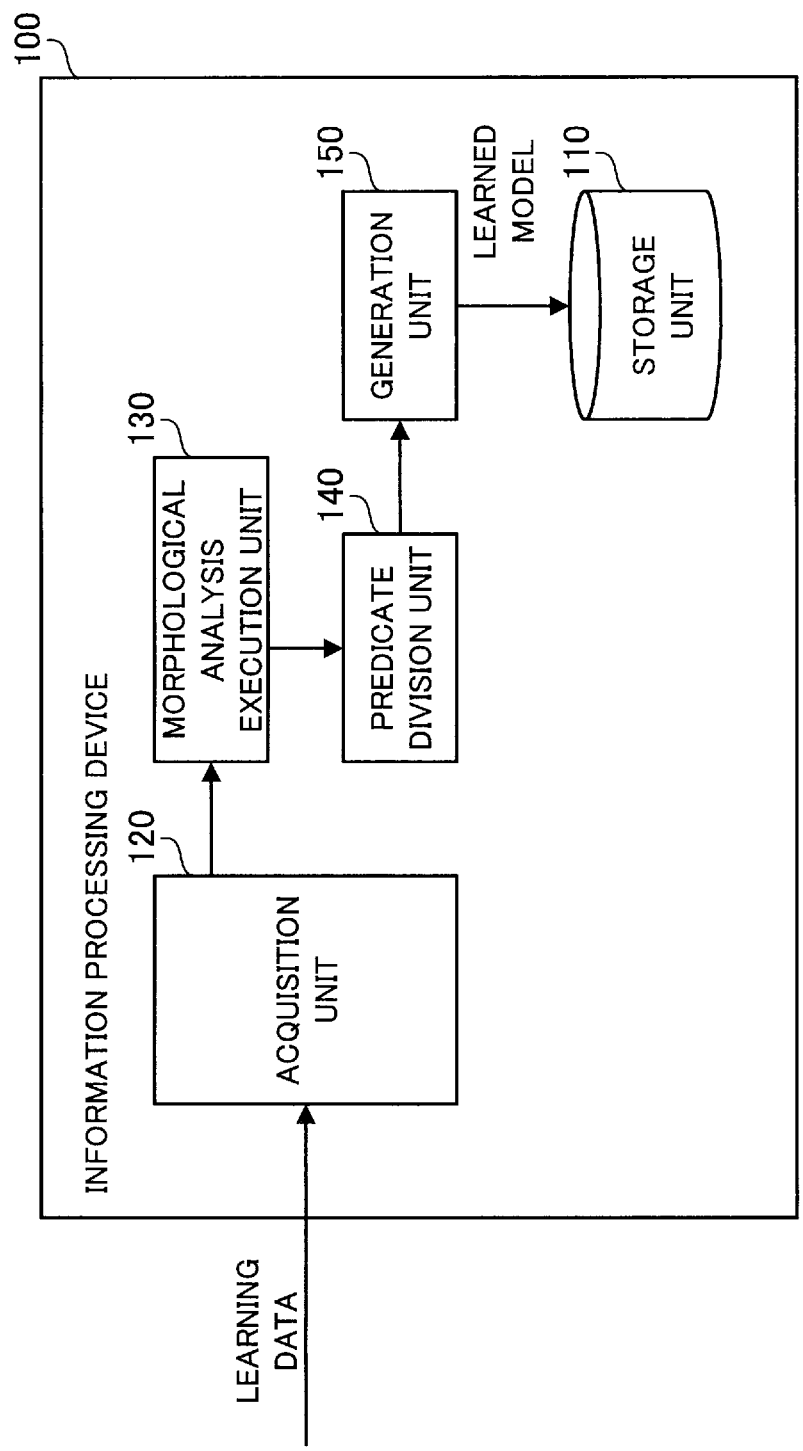
FIG. 2 is a diagram showing functional blocks included in the information processing device in a learning phase in the first embodiment.

FIG. 2 is a diagram showing functional blocks included in the information processing device in a learning phase in the first embodiment. The information processing device 100 includes a storage unit 110, an acquisition unit 120, a morphological analysis execution unit 130, a predicate division unit 140 and a generation unit 150.

The storage unit 110 may be implemented as a storage area reserved in the volatile storage device 102 or the nonvolatile storage device 103.

Part or all of the acquisition unit 120, the morphological analysis execution unit 130, the predicate division unit 140 and the generation unit 150 may be implemented by the processing circuitry. Part or all of the acquisition unit 120, the morphological analysis execution unit 130, the predicate division unit 140 and the generation unit 150 may be implemented as modules of a program executed by the processor 101. For example, the program executed by the processor 101 is referred to also as a generation program. The generation program has been recorded in a record medium, for example.

The acquisition unit 120 acquires learning data. Specifically, the acquisition unit 120 acquires a plurality of character strings. For example, the acquisition unit 120 acquires learning data including a plurality of character strings. The learning data is text data. Further, the learning data may be referred to also as a learning example text.

The morphological analysis execution unit 130 executes morphological analysis on the plurality of character strings. By this, a plurality of speech-parted words, as words to each of which a part of speech (word category) has been assigned, are obtained. Further a speech-parted word may be expressed "a word with a part of speech".

Here, the acquisition unit 120 may successively acquire the character strings as the learning data. By this, a plurality of character strings are acquired. Then, the morphological analysis execution unit 130 may execute the morphological analysis on the successively acquired character strings. By this, a plurality of speech-parted words are obtained.

A function of the predicate division unit 140 will be described later. Incidentally, the function of the predicate division unit 140 may be included in the generation unit 150. Namely, the information processing device 100 may include the storage unit 110, the acquisition unit 120, the morphological analysis execution unit 130, and the generation unit 150 including the function of the predicate division unit 140.

The generation unit 150 generates a learned model based on a plurality of words as a plurality of predicates among the plurality of speech-parted words obtained by executing the morphological analysis on the plurality of character strings and a plurality of words among the plurality of speech-parted words. In other words, the generation unit 150 generates a learned model based on a plurality of words corresponding to a plurality of predicates among the plurality of speech-parted words and a plurality of words among the plurality of speech-parted words. Here, the plurality of words among the plurality of speech-parted words are words whose part of speech (word category) is a verb, a noun, an adjective or the like. Namely, the plurality of words among the plurality of speech-parted words can be words of any part of speech. The word as a predicate is a word that is a verb, an adjective, an adjective verb or a sa-column irregular conjugation noun (verbing noun in the Japanese language).

The learned model can be referred to also as inference information. The inference information is information indicating correspondence relationship between each of the plurality of words as the plurality of predicates and each of a plurality of pieces of relationship information. The relationship information indicates relationship regarding each of the plurality of words. The relationship information may be considered to be represented by a two-dimensional table. Namely, the relationship information may be regarded as two-dimensional information. In the inference information, a word as a predicate and relationship information are associated with each other. Accordingly, the inference information may be regarded as three-dimensional information. Thus, the learned model may be regarded as three-dimensional information.

Incidentally, as will be described later as an example, the generation unit 150 generates the learned model based on "drive", "work", "hit", etc. among the plurality of speech-parted words and "driver", "car", etc. among the plurality of speech-parted words.

Further, the generation unit 150 may generate the learned model based on a plurality of words as a plurality of predicates among the plurality of speech-parted words and a plurality of words as a plurality of nouns among the plurality of speech-parted words.

In the following description, it is assumed that the generation unit 150 generates the learned model based on a plurality of words as a plurality of predicates among the plurality of speech-parted words and a plurality of words as a plurality of nouns among the plurality of speech-parted words.

Incidentally, while a description will be given in a subsequent utilization phase, the information processing device is capable of inferring the meaning of a first word included in a plurality of words among the plurality of speech-parted words by using the learned model. For example, the information processing device is capable of inferring the meaning of "driver" by using the learned model. Incidentally, "driver" is the first word, for example.

Next, a process executed by the information processing device 100 will be described below by using flowcharts.

Figure 3:
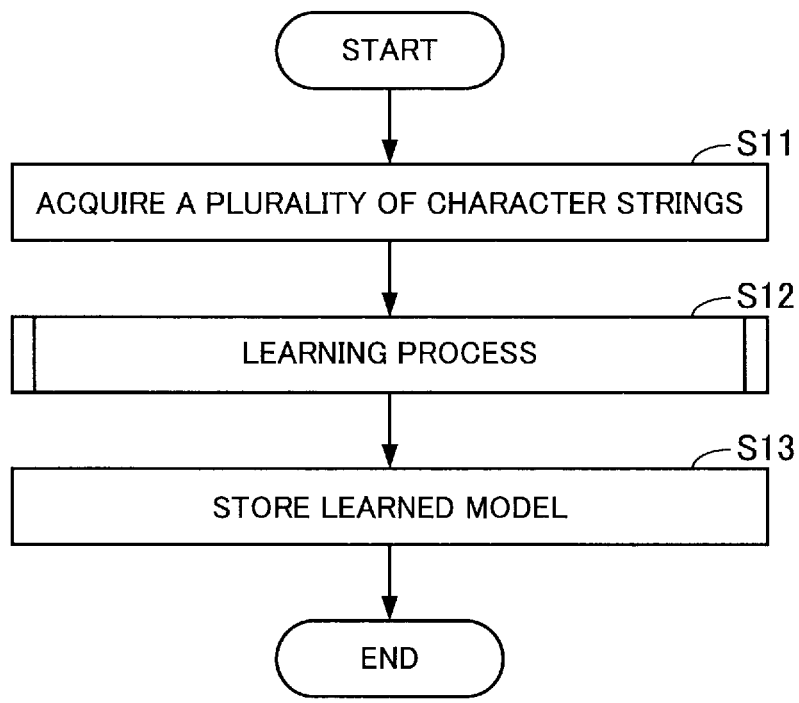
FIG. 3 is a flowchart (No. 1) showing an example of a process executed by the information processing device in the learning phase in the first embodiment.

FIG. 3 is a flowchart (No. 1) showing an example of the process executed by the information processing device in the learning phase in the first embodiment.

(Step S11) The acquisition unit 120 acquires a plurality of character strings.

(Step S12) The morphological analysis execution unit 130, the predicate division unit 140 and the generation unit 150 execute a learning process. In the learning process, the learned model is generated.

(Step S13) The generation unit 150 stores the learned model in the storage unit 110. It is also possible for the generation unit 150 to store the learned model in an external device connectable to the information processing device 100.

Figure 4:
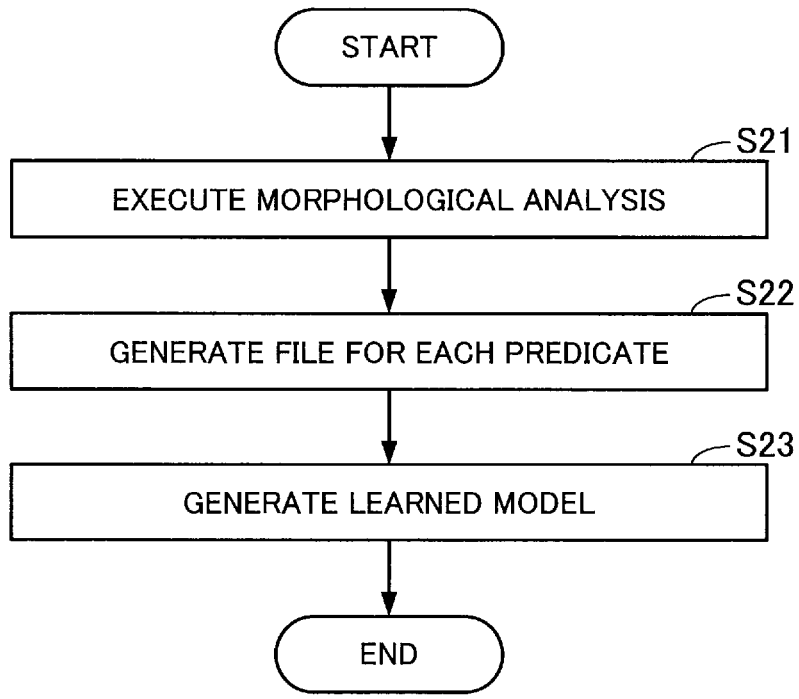
FIG. 4 is a flowchart showing an example of a learning process in the first embodiment.

FIG. 4 is a flowchart showing an example of the learning process in the first embodiment. The process of FIG. 4 corresponds to the step S12.

(Step S21) The morphological analysis execution unit 130 executes the morphological analysis on the plurality of character strings. Specifically, the morphological analysis execution unit 130 divides the plurality of character strings into a plurality of speech-parted words. The morphological analysis will be explained below by using a concrete example. For example, the morphological analysis execution unit 130 divides a character string "a driver driving a car" included in the plurality of character strings into "car (noun)", "wo (particle)" (in the Japanese language), "drive (verb)" and "driver (noun)" (when the language is Japanese).

(Step S22) The predicate division unit 140 generates a file for each predicate based on the plurality of speech-parted words. For each predicate, the predicate division unit 140 registers a plurality of nouns in the character string including the predicate in the file. For example, the predicate division unit 140 registers "car (noun)" and "driver (noun)" in the character string "a driver driving a car" including "drive (verb)" as a predicate in the file of "drive (verb)". While a verb is used as a predicate in the above example, a declinable word of a different type may also be used as a predicate.

Incidentally, the plurality of nouns in the character string including the predicate are referred to as a sub-learning example text. For example, the sub-learning example text is "car (noun)" and "driver (noun)".

(Step S23) The generation unit 150 generates the learned model. The learned model is generated based on reinforcement learning, supervised learning, transfer learning, semi-supervised learning or the like. As an example, unsupervised learning by using a sub-word context matrix having a rank increased in regard to predicates will be described below. Here, the unsupervised learning is a method of learning characteristics of learning data by giving learning data including no result (i.e., label) to the learning device.

Let $w_1, \ldots, w_M$ represent M types of sets of words appearing in the learning data, a sub-word context matrix obtained from the sub-learning example text is represented by a model in which a matrix M having elements $m_{i,j}$ each representing a total number #(i, j) of times of appearance as co-occurrence of a word wi and a word wj, included in the learning data, in the sub-learning example text is provided with its respective predicate label. Each elements $m_{i,j}$ is represented by the following expression (1):

$$m_{i,j} = \#(i,j) \tag{1}$$

The model generated finally is represented by a tensor whose rank is 3. Specifically, the generated model is represented by the sub-word context matrix provided with respective predicate label $V_k$. Incidentally, K types of predicates in the learning data are represented as $V_1, \ldots, V_K$. Parenthetically, in the utilization phase, the information processing device outputs an associated predicate label as a meaning associated with the co-occurrence of words by using a plurality of sub-word context matrices.

The generation unit 150 may generate the learned model by using a scale of pointwise mutual information. When the number of times of appearance of a word $w_i$ is $m_i$, the number of times of appearance of a word $w_j$ is $m_j$ and the total number of words in the learning data is N, the pointwise mutual information $PMI_{i,j}$ is represented by the following expression (2):

$$m_{i,j} = PMI_{i,j} = \log_2 \frac{m_{i,j} \times N}{m_i \times m_j} \tag{2}$$

Next, the process will be described specifically below. The generation unit 150 uses the file generated for each predicate. The generation unit 150 generates the sub-word context matrix provided with a predicate label by counting sub-learning example texts regarding the same predicate. The sub-word context matrix will be shown specifically below.

FIG. 5 is a diagram showing an example (No. 1) of the sub-word context matrix in the first embodiment. For example, based on "car (noun)" and "driver (noun)" registered in the file of "drive (verb)" as a predicate, the generation unit 150 adds 1 to $m_{i,i}$ ("driver (noun)", "driver (noun)"), $m_{j,j}$ ("car (noun)", "car (noun)"), $m_{i,j}$ ("driver (noun)", "car (noun)") and $m_{j,i}$ ("car (noun)", "driver (noun)"). Incidentally, the initial state of the sub-word context matrix is 0.

As above, the generation unit 150 generates the sub-word context matrix provided with a predicate label. The generation unit 150 is capable of generating a plurality of sub-word context matrices provided with a plurality of predicate labels by repeating the counting of sub-learning example texts regarding the same predicate. Namely, the generation unit 150 generates a learned model that uses a plurality of sub-word context matrices provided with a plurality of predicate labels by executing learning based on a plurality of sub-learning example texts. Here, a concrete example of the plurality of sub-word context matrices provided with the plurality of predicate labels will be shown below.

FIG. 6 is a diagram showing an example (No. 2) of the sub-word context matrix in the first embodiment. FIG. 6 shows a sub-word context matrix regarding a predicate label "drive (verb)". FIG. 6 shows a sub-word context matrix regarding a predicate label "work (verb)". FIG. 6 shows a sub-word context matrix regarding a predicate label "hit (verb)".

After the step S23 is over, the process advances to the step S13.

As above, the information processing device 100 generates a learned model that uses a plurality of sub-word context matrices. Incidentally, the information processing device 100 may relearn the learned model.

The above description was given of the case where the acquisition unit 120 acquires a plurality of character strings. The plurality of character strings can be a character string of a question sentence and a character string of an answer sentence to the question sentence. Thus, a case where the acquisition unit 120 acquires a character string of a question sentence and a character string of an answer sentence will be described below.

Figure 7:
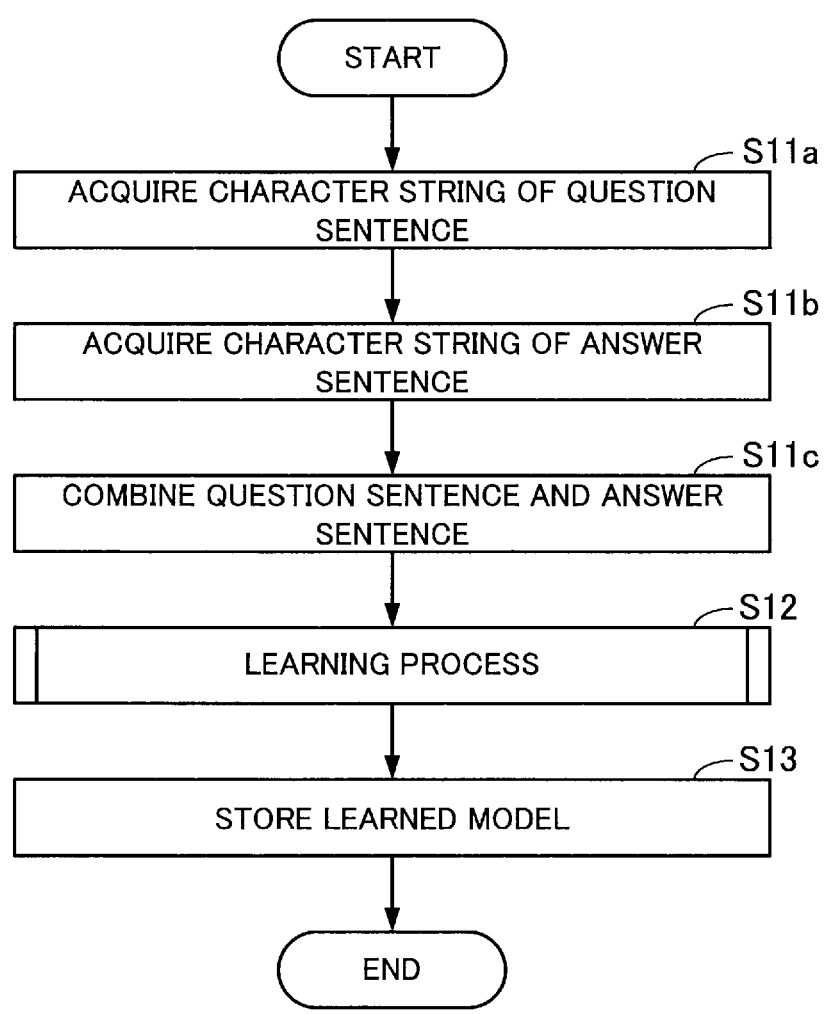
FIG. 7 is a flowchart (No. 2) showing an example of the process executed by the information processing device in the learning phase in the first embodiment.

FIG. 7 is a flowchart (No. 2) showing an example of the process executed by the information processing device in the learning phase in the first embodiment.

The process of FIG. 7 differs from the process of FIG. 3 in that steps S11a, S11b and S11c are executed. Therefore, the steps S11a, S11b and S11c will be described below with reference to FIG. 7. In regard to the other steps in FIG. 7, the description of the processing therein is left out by assigning them the same step numbers as in FIG. 3.

(Step S11a) The acquisition unit 120 acquires a character string of a question sentence. It is also possible for the acquisition unit 120 to acquire a plurality of question sentences.

(Step S11b) The acquisition unit 120 acquires a character string of an answer sentence. It is also possible for the acquisition unit 120 to acquire a plurality of answer sentences.

(Step S11c) The morphological analysis execution unit 130 combines together the character string of the question sentence and the character string of the answer sentence.

Incidentally, in the step S12, the morphological analysis execution unit 130 executes the morphological analysis on the combined character string.

Further, the acquisition unit 120 may acquire the character string of the answer sentence before acquiring the character string of the question sentence. Furthermore, the morphological analysis execution unit 130 does not necessarily need to combine together the character string of the question sentence and the character string of the answer sentence. In the case where the combining is not executed, the morphological analysis execution unit 130 in the step S21 executes the morphological analysis on the plurality of character strings (i.e., the character string of the question sentence and the character string of the answer sentence).

FIG. 8 is a diagram showing a concrete example of the case where the learned model is generated based on a question sentence and an answer sentence in the first embodiment.

FIG. 8 shows a concrete example of the character string of the question sentence and the character string of the answer sentence. For example, it is assumed that "hit (verb)", "driver (noun)", "carry (noun)" and "golf (noun)" have been obtained by the morphological analysis. The generation unit 150 adds 1 to information indicating the relationship between "driver (noun)" and "carry (noun)" in the sub-word context matrix corresponding to "hit (verb)". The generation unit 150 adds 1 to information indicating the relationship between "driver (noun)" and "golf (noun)" in the sub-word context matrix corresponding to "hit (verb)".

As above, the information processing device 100 is capable of generating the learned model based on a question sentence and an answer sentence.

<Utilization Phase>

FIG. 9 is a diagram showing functional blocks included in the information processing device in the utilization phase in the first embodiment. Each component in FIG. 9 being the same as a component shown in FIG. 2 is assigned the same reference character as in FIG. 2. The information processing device 100a includes the storage unit 110, an acquisition unit 120a, a morphological analysis execution unit 130a, a designation reception unit 160, an inference unit 170 and an output unit 180.

Here, the information processing device 100 and the information processing device 100a can be either the same device or different devices. For example, in the case where the information processing device 100 and the information processing device 100a are the same device, the information processing device 100a includes the predicate division unit 140 and the generation unit 150. Further, in the case where the information processing device 100 and the information processing device 100a are the same device, the acquisition unit 120a has the function of the acquisition unit 120 and the morphological analysis execution unit 130a has the function of the morphological analysis execution unit 130.

Part or all of the acquisition unit 120a, the morphological analysis execution unit 130a, the designation reception unit 160, the inference unit 170 and the output unit 180 may be implemented by processing circuitry included in the information processing device 100a. Part or all of the acquisition unit 120a, the morphological analysis execution unit 130a, the designation reception unit 160, the inference unit 170 and the output unit 180 may be implemented as modules of a program executed by a processor included in the information processing device 100a. The program has been recorded in a record medium, for example.

The acquisition unit 120a acquires character string data. Further, the acquisition unit 120a acquires a learned model. For example, the acquisition unit 120a acquires the learned model from the storage unit 110. In cases where the learned model has been stored in an external device, the acquisition unit 120a acquires the learned model from the external device.

The morphological analysis execution unit 130a executes the morphological analysis on the character string data acquired by the acquisition unit 120a.

The designation reception unit 160 makes a display device display a plurality of words obtained by executing the morphological analysis on the character string data acquired by the acquisition unit 120a. Here, the plurality of words are words whose part of speech (word category) is a verb, a noun, an adjective or the like. Namely, the plurality of words can be words of any part of speech. The word as a predicate is a word that is a verb, an adjective, an adjective verb or a sa-column irregular conjugation noun (verbing noun in the Japanese language).

Further, the display device is, for example, a display connectable to the information processing device 100a. A user designates a target word from the plurality of words displayed by the display device. The designation reception unit 160 receives the designation of the target word. The target word is referred to also as a first word.

The inference unit 170 infers the meaning of the target word by using the learned model.

The output unit 180 outputs the result of the inference. Further, the output unit 180 outputs likelihood of the meaning of the target word.

Next, a process executed by the information processing device 100a will be described below by using a flowchart.

FIG. 10 is a flowchart showing an example of the process executed by the information processing device in the utilization phase in the first embodiment.

(Step S31) The acquisition unit 120a acquires character string data. For example, the character string data represents "a driver of a car".

(Step S32) The morphological analysis execution unit 130a executes the morphological analysis on the character string data. For example, the morphological analysis execution unit 130a divides the character string data "a driver of a car" into "car (noun)", "of (particle (in the Japanese language))" and "driver (noun)" (when the language is Japanese).

(Step S33) The designation reception unit 160 makes the display device display words S ("car (noun)" and "driver (noun)") obtained by excluding particles (in the Japanese language), auxiliary verbs, symbols and the like from the words as the result of the dividing.

The user designates the target word from the words displayed by the display device. It is assumed here that $w_i$ "driver (noun)" has been designated as the target word.

(Step S34) The designation reception unit 160 receives the designated target word.

(Step S35) The inference unit 170 executes an inference process of inferring the meaning of the target word by using the leaned model. The process will be described in detail below. FIG. 6 is used in the description. For example, the inference unit 170 refers to each row of $w_i$ "driver (noun)" in the leaned model. The inference unit 170 judges whether or not the words S ("car (noun)" and "driver (noun)") exist in the row of "driver (noun)". When the words S ("car (noun)" and "driver (noun)") exist in the row of "driver (noun)", the inference unit 170 calculates a count $C_{wi}$ by using expression (3). Incidentally, the count $C_{wi}$ is a sum total of $m_{i,j}$.

$$C_{wi} = \Sigma_{j=1}^{M} m_{ij} \text{ (if } w_j \in S, i \neq j) \tag{3}$$

For example, when the predicate label is "drive (verb)", the inference unit 170 calculates a result of expression (4).

$$C_{wi} = 159 = w_{driver,car} \tag{4}$$

The inference unit 170 calculates the count $C_{wi}$ in a similar manner also for every other predicate label. The inference unit 170 calculates a maximum value out of the counts $C_{wi}$ regarding the predicate labels. The maximum value is defined as likelihood $Score_{wi}$ of the meaning. The likelihood $Score_{wi}$ is calculated by using expression (5).

$$Score_{w_i} = \max\{C_{w_i}^{V1}, \ldots, C_{w_i}^{VK}\} \tag{5}$$

By this, the inference unit 170 calculates a result of expression (6).

$$159 = C_{driver(noun)}^{drive(verb)} \tag{6}$$

The predicate label having the maximum value is defined as a meaning $Label_{wi}$. The meaning $Label_{wi}$ is represented by the following expression (7): Incidentally, the meaning $Label_{wi}$ is "drive (verb)", for example.

$$Label_{w_i} = \max^{Label}\{C_{w_i}^{V1}, \ldots, C_{w_i}^{VK}\} \tag{7}$$

As above, the inference unit 170 infers the meaning of the target word based on the learned model and a plurality of words obtained by executing the morphological analysis on the character string data acquired by the acquisition unit 120a. For example, the inference unit 170 infers the meaning of "driver (noun)" based on the learned model and "car (noun)" and "driver (noun)" obtained by executing the morphological analysis on "a driver of a car".

(Step S36) The output unit 180 outputs the result of the inference. For example, the output unit 180 outputs "drive (verb)" being the meaning $Label_{wi}$. In other words, the output unit 180 outputs a meaning label "drive (verb)". Further, the output unit 180 outputs the likelihood $Score_{wi}$.

As above, the information processing device 100a is capable of inferring that the meaning of "driver" in the character string data "a driver of a car" is "driver who drives". Further, the information processing device 100a is capable of inferring the meaning even when the character string data includes no predicate.

Alternatively, for example, the information processing device 100a acquires character string data "a driver of a tool". When the target word of the character string data "a driver of a tool" is "driver", the information processing device 100a infers that the meaning of "driver" is "driver that works". Further, the information processing device 100a outputs information indicating that the likelihood Score is 9.

Alternatively, for example, the information processing device 100a acquires character string data "a driver of golf".

When the target word of the character string data "a driver of golf" is "driver", the information processing device 100a infers that the meaning of "driver" is "driver that hits". Further, the information processing device 100a outputs information indicating that the likelihood $Score_{wi}$ is 6.

As above, the information processing device 100a is capable of inferring the meaning, which varies for the same word depending on the context, by using the learned model. Further, the information processing device 100a outputs the meaning label. Accordingly, the user can intuitively understand the meaning label. Furthermore, the information processing device 100a outputs the likelihood. Accordingly, the user can learn the likelihood of the meaning of the target word.

Here, a comparative example will be shown below.

FIG. 11 is a diagram showing the comparative example. FIG. 11 shows one sub-word context matrix. When a certain device infers the meaning by using the sub-word context matrix of FIG. 11 as the learned model, the device infers only one meaning since there is only one sub-word context matrix.

In contrast, the learned model generated by the information processing device 100 includes a plurality of sub-word context matrices. Thus, the learned model generated by the information processing device 100 is capable of dealing with the ambiguity. For example, as described above, the information processing device 100a is capable of inferring the meaning, which varies for the same word depending on the context, by using the learned model. Further, the information processing device 100 does not execute the dimensional compression when generating the learned model. Furthermore, the information processing device 100 executes low-cost calculation such as repeating the counting of sub-learning example texts. Therefore, the information processing device 100 is capable of generating the learned model in a short processing time. Thus, according to the first embodiment, the information processing device 100 is capable of generating a learned model capable of dealing with the ambiguity in a short processing time.

Second Embodiment

<Utilization Phase>

Next, a second embodiment will be described below. In the second embodiment, the description will be given mainly of features different from those in the first embodiment. In the second embodiment, the description is omitted for features in common with the first embodiment. FIGS. 1 to 10 are referred to in the description of the second embodiment.

Figure 12:
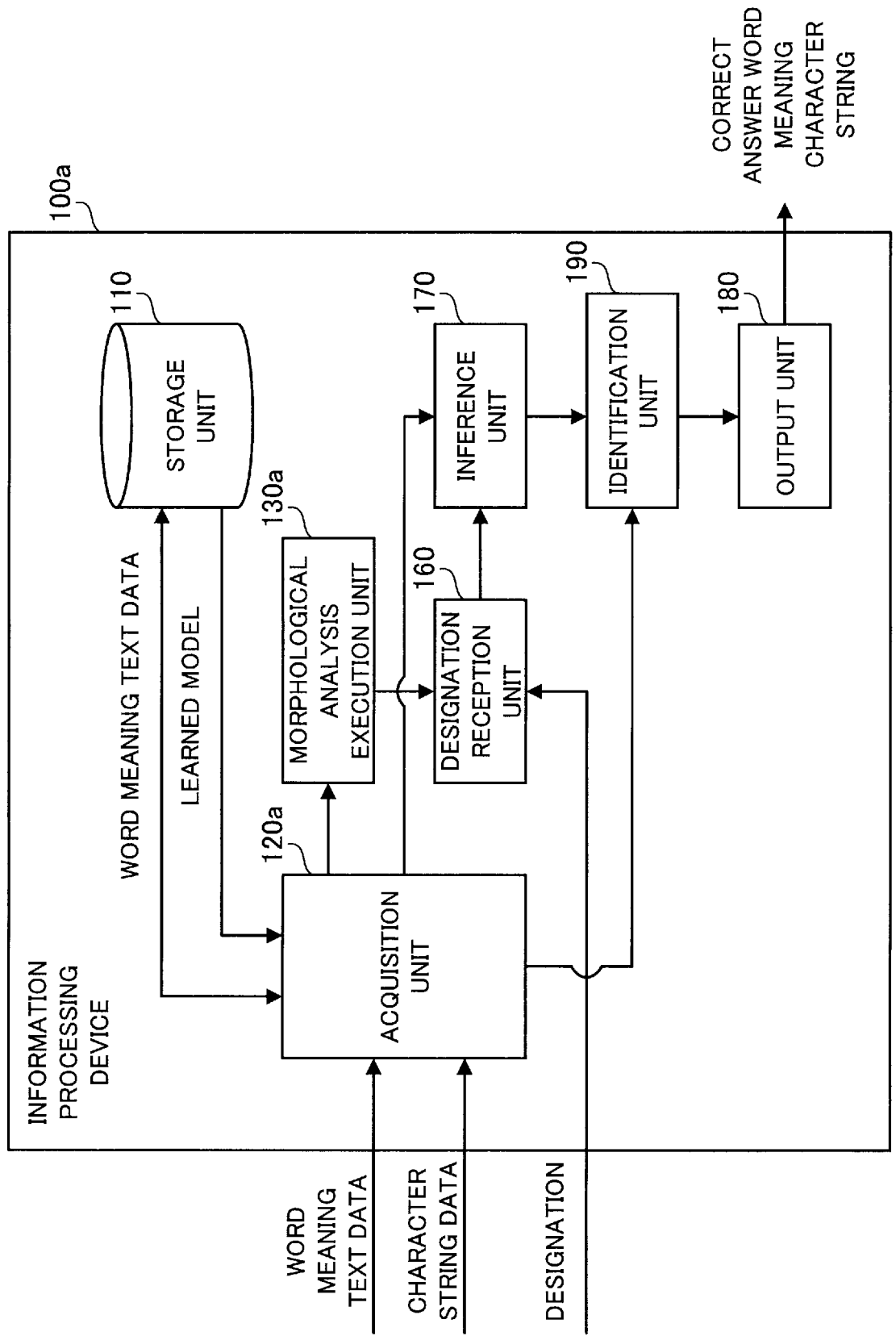
FIG. 12 is a diagram showing functional blocks included in an information processing device in a utilization phase in a second embodiment.

FIG. 12 is a diagram showing functional blocks included in an information processing device in the utilization phase in the second embodiment. Each component in FIG. 12 being the same as a component shown in FIG. 9 is assigned the same reference character as in FIG. 9.

The information processing device 100a further includes an identification unit 190. The acquisition unit 120a further acquires word meaning text data. The word meaning text data is a plurality of word meaning character strings as a plurality of character strings (when the language is Japanese) indicating word meanings. In other words, the word meaning text data is a plurality of word meaning character strings as a plurality of character strings indicating word meanings corresponding to the target word. For example, the word meaning text data includes "a driver of a car", "a driver of a tool" and "a driver of golf" (when the language is Japanese). In other words, the word meaning text data includes "a driver of a car", "a driver of a tool" and "a driver of golf" corresponding to "driver".

The identification unit 190 identifies a word meaning character string having the same meaning as the target word out of the plurality of word meaning character strings. The identified word meaning character string is referred to as a correct answer word meaning character string. The output unit 180 outputs the correct answer word meaning character string.

Next, a process executed by the information processing device 100*a* will be described below by using a flowchart.

Figure 13:
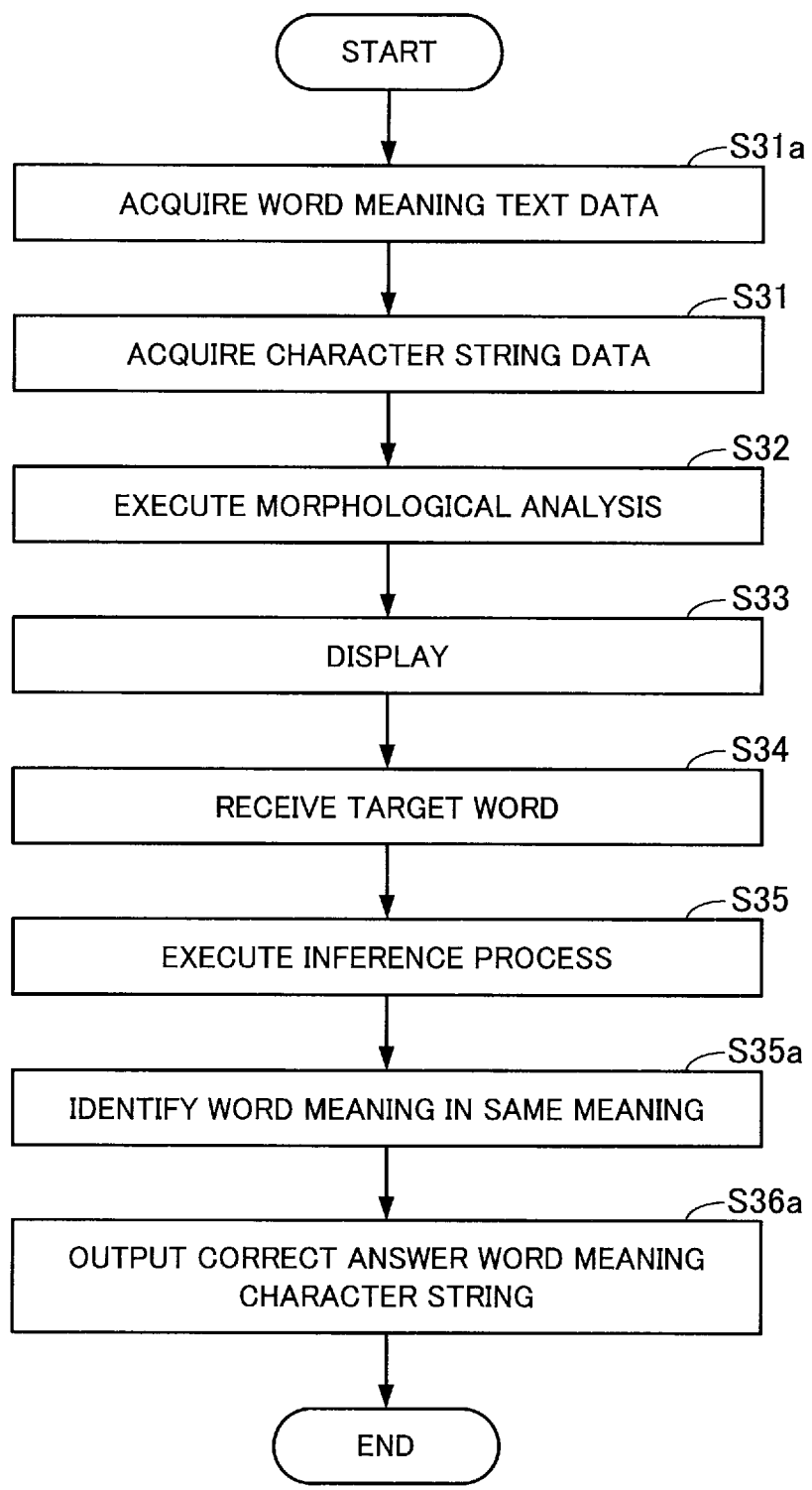
FIG. 13 is a flowchart showing an example of a process executed by the information processing device in the utilization phase in the second embodiment.

FIG. 13 is a flowchart showing an example of the process executed by the information processing device in the utilization phase in the second embodiment.

The process of FIG. 13 differs from the process of FIG. 10 in that steps S31*a* and S35*a* are executed and step S36*a* is executed instead of the step S36. Therefore, the steps S31*a*, S35*a* and S36*a* will be described below with reference to FIG. 13. In regard to the other steps in FIG. 13, the description of the processing therein is left out by assigning them the same step numbers as in FIG. 10.

(Step S31*a*) The acquisition unit 120*a* acquires the word meaning text data. For example, the word meaning text data includes "a driver of a car", "a driver of a tool" and "a driver of golf". The acquisition unit 120*a* stores the word meaning text data in the storage unit 110.

Here, in the step S31, the acquisition unit 120*a* acquires character string data "taxi driver". In the step S35, the inference unit 170 infers that the meaning of "taxi driver" is "driver who drives". The likelihood is 15.

(Step S35*a*) The identification unit 190 acquires the word meaning text data via the acquisition unit 120*a*. Here, the inference unit 170 has inferred that the meaning of "taxi driver" is "driver who drives". The identification unit 190 identifies a word meaning in the same meaning as "driver who drives" out of the word meaning text data. For example, "car" and "drive" have a relationship with each other. The identification unit 190 identifies that "a driver of a car" has the same meaning as "driver who drives" based on information indicating the relationship between "car" and "drive". Then, the identification unit 190 identifies "a driver of a car" out of the word meaning text data.

(Step S36*a*) The output unit 180 outputs the correct answer word meaning character string. For example, the output unit 180 outputs information indicating that the correct answer word meaning character string for "driver" in "taxi driver" is "a driver of a car".

Alternatively, for example, when the acquisition unit 120*a* has acquired character string data "precision driver", the identification unit 190 identifies "a driver of a tool" out of the word meaning text data. Then, the output unit 180 outputs information indicating that the correct answer word meaning character string for "driver" in "precision driver" is "a driver of a tool".

According to the second embodiment, the information processing device 100*a* is capable of increasing the likelihood of the meaning by using the word meaning text data.

While a case of inferring the meaning of a noun was described as an example in each of the above-described embodiments, the meaning of a part of speech other than a noun can also be inferred in a similar manner. Further, features in the embodiments can be appropriately combined with each other.

DESCRIPTION OF REFERENCE CHARACTERS

100, 100*a*: information processing device, 101: processor, 102: volatile storage device, 103: nonvolatile storage device, 110: storage unit, 120, 120*a*: acquisition unit, 130, 130*a*: morphological analysis execution unit, 140: predicate division unit, 150: generation unit, 160: designation reception unit, 170: inference unit, 180: output unit, 190: identification unit

What is claimed is:

1. An information processing device comprising:
   acquiring circuitry to acquire a plurality of character strings;
   morphological analysis executing circuitry to execute morphological analysis on the plurality of character strings; and
   generating circuitry to generate inference information for inferring meaning of a first word included in a plurality of words among a plurality of speech-parted words obtained by executing the morphological analysis on the plurality of character strings based on a plurality of words as a plurality of predicates among the plurality of speech-parted words and a plurality of words among the plurality of speech-parted words,
   wherein the inference information is information indicating correspondence relationship between each of the plurality of words as the plurality of predicates and each of a plurality of pieces of relationship information, the inference information being three-dimensional information, and
   the plurality of pieces of relationship information corresponding to each of the plurality of words as the plurality of predicates is information indicating relationship regarding each of the plurality of words among the plurality of speech-parted words, the relationship information being a two-dimensional array of pieces of information each representing a measure of co-occurrence between two of the plurality of words.

2. The information processing device according to claim 1, wherein the generating circuitry generates the inference information based on a plurality of words as a plurality of verbs among the plurality of speech-parted words and a plurality of words among the plurality of speech-parted words.

3. The information processing device according to claim 1, wherein the plurality of character strings are a character string of a question sentence and a character string of an answer sentence to the question sentence.

4. The information processing device according to claim 1, further comprising:
   designation receiving circuitry; and
   inferring circuitry, wherein
   the acquiring circuitry acquires character string data as a character string including the first word,
   the morphological analysis executing circuitry executes the morphological analysis on the character string data,
   the designation receiving circuitry receives designation of the first word out of a plurality of words obtained by executing the morphological analysis on the character string data, and
   the inferring circuitry infers the meaning of the first word based on the plurality of words obtained by executing the morphological analysis on the character string data and the inference information.

5. The information processing device according to claim 4, further comprising outputting circuitry to output likelihood of the meaning of the first word.

6. The information processing device according to claim 4, further comprising:
   identifying circuitry; and
   outputting circuitry, wherein the acquiring circuitry acquires a plurality of word meaning character strings as a plurality of character strings indicating word meanings, the identifying circuitry identifies a word meaning character string having a same meaning as the inferred meaning of the first word out of the plurality of word meaning character strings, and the outputting circuitry outputs the identified word meaning character string.

7. A generation method performed by an information processing device, the generation method comprising:

acquiring a plurality of character strings;

executing morphological analysis on the plurality of character strings; and generating inference information for inferring meaning of a first word included in a plurality of words among a plurality of speech-parted words obtained by executing the morphological analysis on the plurality of character strings based on a plurality of words as a plurality of predicates among the plurality of speech-parted words and a plurality of words among the plurality of speech-parted words, wherein the inference information is information indicating correspondence relationship between each of the plurality of words as the plurality of predicates and each of a plurality of pieces of relationship information, the inference information being three-dimensional information, and the plurality of pieces of relationship information corresponding to each of the plurality of words as the plurality of predicates is information indicating relationship regarding each of the plurality of words among the plurality of speech-parted words, the relationship information being a two-dimensional array of pieces of information each representing a measure of co-occurrence between two of the plurality of words.

8. An information processing device comprising:

a processor to execute a program; and a memory to store the program which, when executed by the processor, performs processes of, acquiring a plurality of character strings;

executing morphological analysis on the plurality of character strings; and generating inference information for inferring meaning of a first word included in a plurality of words among a plurality of speech-parted words obtained by executing the morphological analysis on the plurality of character strings based on a plurality of words as a plurality of predicates among the plurality of speech-parted words and a plurality of words among the plurality of speech-parted words, wherein the inference information is information indicating correspondence relationship between each of the plurality of words as the plurality of predicates and each of a plurality of pieces of relationship information, the inference information being three-dimensional information, and the plurality of pieces of relationship information corresponding to each of the plurality of words as the plurality of predicates is information indicating relationship regarding each of the plurality of words among the plurality of speech-parted words, the relationship information being a two-dimensional array of pieces of information each representing a measure of co-occurrence between two of the plurality of words.

* * * * *